Patented May 22, 1934

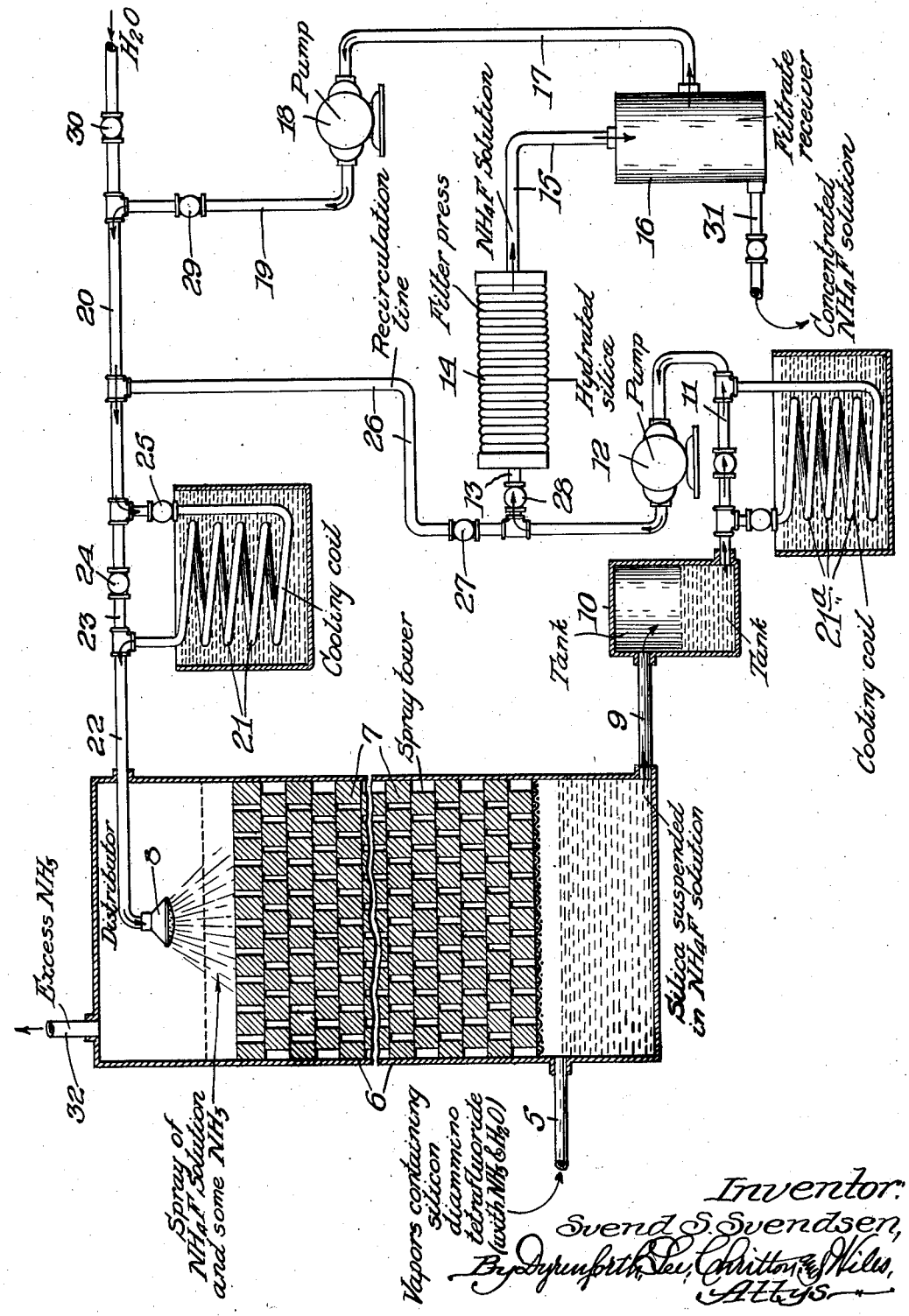

1,959,747

UNITED STATES PATENT OFFICE 1,959,747

MANUFACTURE OF PRECIPITATED SILICA

Svend S. Svendsen, Chicago, Ill., assignor to Clay Reduction Company, a corporation of Illinois Application February 3, 1930, Serial No. 425,671

24 Claims. (Cl. 23—182)

The present invention relates to improvements in the manufacture of precipitated silica, and is in part a continuation of my prior application Serial No. 242,291, filed December 23, 1927, now Patent No. 1,859,998.

In accordance with the present invention, silicon diammino tetrafluoride is decomposed by water or by water and ammonia, either in succession or simultaneously, to form a precipitated silica product having novel, advantageous characteristics.

The silicon diammino tetrafluoride may be prepared by the reaction of an ammonium fluoride compound, such as normal ammonium fluoride or ammonium bifluoride, upon a silicious material such as quartz, clay, talc or the like. In my prior application Serial No. 191,267 filed May 13, 1927, and copending Serial No. 425,345, filed February 1, 1930, I have fully described the manufacture of silicon diammino tetrafluoride. The following briefly summarizes a satisfactory procedure. A suitable silicious material, which may be preheated to facilitate the reaction with the ammonium fluoride compound, is reacted upon with the latter, either in solution or dry, at a temperature above 34° C. and, in case dry reaction is desired, above 100° C. The reaction between the silica content of the mineral and the ammonium fluoride compound proceeds apparently with the formation of ammonium silicofluoride, water and ammonia. Fluorides of metals present in the silicious material are also formed. On further heating, ammonium-silico-fluoride is converted into silicon d'ammino tetrafluoride ($SiF_4(NH_3)_2$), and volatilizes at a temperature above 230° C., and preferably above 250° C. For example, the reaction may be carried out as follows:

About 120 tons of clay, preferably calcined at a red-heat to increase its reactivity, containing on analysis 25% alumina, 60% silica, 3% ferrous oxide, 2% lime, 4% soda and 6% potash, is mixed with an ammonium fluoride solution containing 262 tons of ammonium-fluoride. This is sufficient to convert the silica of the clay into silicon d'ammino tetrafluoride and the metallic oxides into fluorides. The mixture is heated to between 34 and 100° C., preferably between 60° C. and 100° C. The ammonium fluoride is thereby dissociated into ammonia and ammonium bifluoride; the latter attacks the clay, reforming normal ammonium fluoride, which is again decomposed. Ammonia gas is evolved and recovered. Ammonium silicofluoride is formed. The mixture is evaporated to dryness, and further heated to above 230° C. The ammonium silicofluoride is thereby converted into silicon diammino tetrafluoride and metallic fluorides also are formed. At this temperature the silicon diammonio tetrafluoride is volatilized. The same final result is achieved if dry ammonium fluoride crystals are heated with the clay.

In the above example, if it is desired not to leave a metallic fluoride residue, only sufficient ammonium fluoride is used with the clay to form silicon diammino tetrafluoride with the silicon present. Metallic fluorides formed may be decomposed as described in my copending applications.

As a further example of the production of silicon diammino tetrafluoride, quartz is heated to a bright red heat, suddenly cooled by immersion in water and pulverized. While the pulverized quartz is at a temperature of about 150 to 200° C., ammonium-fluoride is added gradually in a proportion sufficient to convert the quartz into silicon diammino tetrafluoride. Water and ammonia are evolved. The temperature is then raised to 230 to 300° C. and silicon diammino tetrafluoride is vaporized.

Silicon diammino tetrafluoride, formed for example as above described, may be condensed and collected, and then caused to react with water or with water and ammonia. Preferably, however, the silicon diammino tetrafluoride is caused to react with water or with water and ammonia by contacting it therewith while in the vapor state, or during its condensation from the vapor state. Previously condensed and collected silicon diammino tetrafluoride may be revaporized for reaction in this manner, or the vapors resulting from the reaction between the silicious material and the ammonium fluoride compound, which vapors contain silicon diammino tetrafluoride, ammonia and water, may be employed in the reaction.

When the silicon diammino tetrafluoride is acted upon by water, ammonium silicon-fluoride, ammonium fluoride and precipitated hydrated silica are formed. The reaction is endothermic. When ammonia is added to this reaction mixture, the final products are ammonium-fluoride and precipitated hydrated silica. This reaction is exothermic. When water and ammonia are both present, the reaction proceeds directly to ammonium fluoride and precipitated silica as end products.

The course of the reactions and the quantities of reagents required may be determined from the following equations, wherein reference to the water contained in the precipitated silica is omitted.

(1) $2SiF_4(NH_3)_2 + 2H_2O = (NH_4)_2SiF_6 + 2NH_4F + SiO_2$ (2) $(NH_4)_2SiF_6 + 4NH_3 + 2H_2O = 6NH_4F + SiO_2$ or, considering the complete reaction when both water and ammonia are employed, the following equation may be employed for explanatory and stoichiometric purposes:

(3) $SiF_4(NH_3)_2 + 2H_2O + 2NH_3 = 4NH_4F + SiO_2$

The reaction expressed by Equation (2) is exothermic as is also the combined reaction as expressed by Equation (3). The reactions should be conducted at a temperature below 34° C. for complete precipitation of the silica, owing to the reversibility of the reaction expressed by Equation (2) above. Silica may be produced in the manner described at temperatures above 34° C., but the completeness of its precipitation is not so great as at lower temperatures.

The hydrated silica produced from the silicon diammino-tetrafluoride by the action of water (Equation 1) and that precipitated by ammonia and water from ammonium silicofluoride (Equation 2) have varying and different characteristics, as pointed out in my co-pending applications Serial No. 543,027, filed June 8, 1931 and Serial No. 547,781, filed June 29, 1931. If the silicon diammino tetrafluoride is subjected to the simultaneous reaction of water and ammonia, the resulting combination product tends to have increased whiteness and opacity, particularly if the reaction is carried out in an ammonium fluoride solution in the presence of ammonia. The combination hydrated silica thus made in a strong ammonium-fluoride solution is not voluminous and filters readily as compared with the slower filtering products made in water or dilute solutions. The opaque variety may, of course, be obtained separately by treating silicon diammino tetrafluoride with water in the absence of ammonia, and filtering the silica so obtained from the soluble ammonium-fluoride and ammonium-silico-fluoride formed simultaneously (Equation 1).

As hereinbefore stated, to effect the reaction, the condensed silicon diammino tetrafluoride may be added to water or to an ammoniacal solution, for example, an ammonium hydroxide solution. However, it is preferred to bring about the reaction by contacting silicon diammino tetrafluoride vapors with water, or with an ammoniacal aqueous liquid, or with water and gaseous ammonia, or combinations of these. For example, the silicon diammino tetrafluoride vapors may be caused to pass into a spray tower into which water or ammonia solution or other ammoniacal aqueous liquid may be sprayed to simultaneously cool the silicon diammino tetrafluoride vapors and condense the latter and bring about the reaction resulting in the formation of precipitated silica.

The liquid drawn off as a result of this reaction contains the precipitated silica in suspension and the precipitated silica may be removed therefrom by any suitable means, such as filtration, and the filtrate reused in the process. Or the filtrate may be drawn off and the ammonium-fluoride content thereof recovered.

When vapors derived from the reaction between silicious material and ammonium-fluoride compounds are employed, the ammonia and water contained in such vapors are effective in replenishing the strength of the solution employed for the reaction with the silicon diammino tetrafluoride, or the ammonia gas may be used in the presence of water or aqueous solutions to effect the reaction with the silicon diammino tetrafluoride. I prefer, however, to employ an aqueous solution of ammonium fluoride in the presence of ammonia, either gaseous or dissolved therein, for the reaction with the silicon diammino tetrafluoride, as a more satisfactory, denser, more opaque, and more uniform precipitated silica is thereby secured, the opacity and density increasing with the strength of the solution. When an aqueous solution of ammonium fluoride in the presence of ammonia is thus employed, the precipitated silica is filtered therefrom, and a part of the filtrate is withdrawn so that the ammonium fluoride therein may be employed in the reaction with silicious material to produce silicon diammino tetrafluoride. The remaining portion, after addition of water or dilute ammonium fluoride solution, may be reused for the reaction with silicon diammino tetrafluoride, the ammonium fluoride strength of the solution being brought up or increased as a result of the reaction.

For example, the operation of the present invention may be carried out in the following manner, as illustrated by the accompanying drawing, in which the figure represents diagrammatically, and partly in section, suitable apparatus for carrying the invention into effect.

As shown in the drawing, the vapors, usually at a temperature of about 250° C. to 300° C., containing silicon diammino tetrafluoride, and also containing ammonia and water vapor as derived from the reaction between silicious material and ammonium fluoride, are introduced through a pipe 5 into the lower portion of a spray tower 6. This tower may be lead-lined, at least in its lower portion. The spray tower contains packing material 7, suitably broken ceramic material, Raschig rings or the like. The hot rising vapors are met by a stream of ammonium fluoride solution containing more or less dissolved ammonia, supplied in the upper portion of the tower through the spray 8. The descending solution reacts with the silicon diammino tetrafluoride vapors, the water and ammonia dissolved therein taking part in the reaction and being in part or wholly replaced and aided by the water vapor and ammonia brought in with the silicon diammino tetrafluoride. The ammonium-fluoride formed in the reaction increases the ammonium-fluoride concentration of the solution. The resulting liquid, containing suspended precipitated silica, is discharged from the tower 6 through the pipe 9, and collected in a tank 10. From this tank it is picked up by the suction line 11 of pump 12, and discharged through the outlet line 13 to filter press 14, in which the precipitated silica is removed from the ammonium fluoride solution. The filtrate passes out of the filter press 14 through line 15 to a receptacle 16. From the receptacle 16, ammonium-fluoride solution is drawn through line 17 by pump 18, which discharges it through line 19 into the line 20. From the line 20, the solution may be passed through the cooling coil 21 to the line 22 leading to the distributor 8 in the top of the tower 6. If desired, a part or all of the liquid may be by-passed around the coil 21 through the line 23 provided with valve 24. The flow of liquid through the cooling coil 21 may be controlled by valve 25. By controlling the cooling of the liquid entering the tower 6, the desired reaction temperature, preferably below 34° C., is maintained therein.

In a modification of the process, the solution leaving the tower is passed through the coil 21ᵃ and is cooled to below 34° C. before passing through filter press 14 to ensure complete reaction as shown in Equation 3, and coil 21 may be by-passed. In this method of operation the liquid in the tower reaches a temperature considerably above 34° C. before passing out at the bottom through pipe 9, due to the exothermic character of the reaction and to the large amount of heat which is absorbed from the entering gases, which usually are at about 250° to 300° C. This higher operating temperature has some advantages. The ammonia gas has a much lower solubility in the hot ammonium fluoride liquor so that the concentration of ammonium-fluoride may become high in the liquor. By applying a vacuum, the ammonia concentration can be further reduced. This is desirable for reasons which will become apparent hereinafter. The excess ammonia gas is vented from tower 6 through pipe 32 to a suitable absorbing or liquefying apparatus. If the liquid leaving tower 6 is considerably above 34° C., the heat contained therein may also be used advantageously, as by means of cooling coil 21 to heat the cold ammonia saturated ammonium-fluoride solution from which ammonium fluoride has been crystallized as described hereinafter. Heating this liquid drives the ammonia therefrom to allow it to be used again in further crystallizing operations, the l'quid then being returned to tower 6 to react with further mixed silicon diammino tetrafluoride and ammonia vapors.

The ammonium-fluoride concentration of the liquid employed in the tower 6 may be varied within wide limits, say from 10 to 50%. However, I prefer to employ a solution of from 20 to 40% ammonium-fluoride content and in general near 40%. The precipitated silica, which is nearly colloidal in fineness, stays in suspension in th's circulating liquid and therefore need not be removed therefrom, as it does not settle out to clog pipes or other apparatus, provided the liquor is not entirely quiescent. It needs to be filtered off only when the concentration of ammonium-fluoride is high enough, preferably about 40% or higher, to be removed by crystallization as described hereinafter.

In starting operations, for example, a solution of about 20% ammonium-fluoride content may be employed. It is recirculated in the initial stages of operation until its ammonium-fluoride concentration is built up to 35 to 40%. To facilitate this circulation, a recirculating line 26, controlled by valve 27 is provided from the outlet line 13 of pump 12 to the line 20. A valve 28 is provided in the line 13 to prevent flow of liquid through the filter press 14, during this stage of the operation. Any part or all of the ammonium-fluoride thus recirculated may be passed through the cooling coil 21 to maintain a temperature in the upper portion of the tower 6 of 34° C. or lower. Upon the ammonium-fluoride solution reaching the desired concentration, the valve 27 is closed to shut off the recirculating line 26, and the valve 28 is opened. The ammonium-fluoride solution containing the precipitated silica is then forced through the filter press 14 and the filtrate is collected in the receiver 16. From the latter it is withdrawn through the line 17 by the pump 18 and discharged through the l'ne 19 to the line 20, from which it passes through the cooling coil 21 back to the line 22 and into the tower 6 through the distributor 8.

The proportion of ammonium-fluoride recirculated in this way is controlled by the valve 29 in the line 19 and by the operation of the pump 18. Additional water may be supplied to the ammonium-fluoride solution entering the tower 6 through the valved line 30. Excess ammonium-fluoride solution may be discharged from the receiver 16 through the discharge line 31. In normal operation, the discharge of ammonium-fluoride solution and the supply of additional water through the system are controlled to maintain the desired volume and concentration of ammonium-fluoride solution in circulation through the tower.

The filter cake of precipitated hydrated silica which collects in filter press 14 is washed with water to remove ammonium-fluoride, preferably using the counter-current principle, the resulting wash water being used in the absorption system. The filter cake is dried at a temperature suitable for its use. By drying at above 230° C. to 250° C. the last traces of ammonium-fluoride are removed by the volatilization of that compound as silicon diammino tetrafluoride. The dried filter cake is preferably sifted through a flour bolter to disintegrate the friable lumps which may be formed.

The precipitated silica obtained by reaction of water or of water and ammonia on silicon diammino tetrafluoride and especially on vaporized silicon diammino tetrafluoride as hereinbefore described, is a distinct product having physical properties differing widely from those of hydrated silica as obtained in the ordinary way. It does not form a gel when precipitated, but forms an easily filtered white suspension, and after filtering and washing, yields a white, clay-like product of high plasticity with an approximate water content of 70%. On drying and calcining the washed material the particles remain as separate entities in contrast to the ordinary silica gel agglomerates. It dries to an opaque, white impalpable powder of low apparent density having a clay-like feel, the dry material having approximately the same volume as the washed filter cake before drying. The particles of the precipitated silica are extremely small and vary somewhat in size with the mode of precipitation and treatment. They are of remarkable uniformity in size, being about one-half to two microns in diameter, the air dried material being somewhat larger than the calcined material. Most of the air dried material averages about one micron in diameter. For any one condition of precipitation and treatment the particle size does not vary more than a fraction of a micron, in contrast to the widely varying sizes of the individual particles of finely ground silica. The individual particles are round to oval in shape when viewed under the microscope.

The air dried precipitated silica after screening or bolting weighs from 12 to 15 pounds per cubic foot. The air dried or moderately heated individual particles have the properties of a colloidal silica. The white impalpable powder, both when freshly formed and after drying, does not have a "jelly" consistency but is characterized by having the properties of a granular or "powdery" precipitate. It may be used as a filter-aid. It does not settle readily from liquids and when used in suspension, as in linseed oil, does not settle appreciably even after standing several months. This is in contrast to the rapid settling characteristic of finely ground silica now used as an extender in paints. It has a greater hiding power than silicas hitherto known, and has a high adsorption power. It has a high covering power in nitrocellulose lacquers. It is an excellent extender for pigments such as titanium oxide and zinc oxide. It is useful in rubber compounding as it may be used as a partial substitute for carbon black. It has a slight abrasive action and may be used as a polishing powder.

The air dried precipitated silica contains about 12% to 15% of water, varying with the humidity of the air. It may be less in extremely dry air and somewhat higher than this range in very humid air. Dried at 110° C., it retains about 5% of water, but on cooling and exposure to air, adsorbs water and reverts to about the same water content as the air dried material. Dried at higher temperatures, it still retains some water adsorbing power, but to a less degree. When calcined at 800° C., it loses its entire water content and the calcined product has relatively slight water adsorbing action.

The ammonium-fluoride filtrate may be used as a raw material for the production of fluoride salts, such as cryolite, or the ammonium-fluoride may be crystallized out and reused in the reaction on silicous material for the production of silicon diammino tetrafluoride. However, if the ammonium-fluoride solution is evaporated to effect crystallization, it gives off ammonia and hydrofluoric acid and the extremely corrosive nature of the latter makes it very difficult to find suitable material for conducting the evaporation step. I have found that by dissolving ammonia in a strong ammonium-fluoride solution, say 30 to 40%, the ammonium-fluoride will crystallize out. The greater the amount of ammonia which is dissolved in the solution, the greater the amount of ammonium-fluoride which crystallizes out. Since ammonia is much more soluble in cold than warm water and since ammonium-fluoride shows little difference in solubility in cold and warm water, it is desirable to chill or refrigerate the solution when ammonia is introduced into it to secure the greatest yield of ammonium-fluoride crystals. If, for instance, to 40% ammonium-fluoride solution at 0° C. half of its weight of dry ammonia is added, about one-half of the ammonium-fluoride present crystallizes out. Substantially dry ammonia gas or liquid ammonia may be used; for example, ammonia given off during the reaction between the silicious material and the ammonium-fluoride compound may be employed for this purpose. A considerable amount of heat is generated and to improve the crystallization, the liquid, as previously explained, should be cooled, preferably to about 0° C. or lower, during the crystallization process. After filtering out the ammonium-fluoride crystals and removing ammonia from the residual fluoride solution by heating, for example, passing around cooling coil 21, and/or by application of vacuum, the latter may be returned to the absorption tower system.

Although I have described in detail a method for treating the freshly formed gaseous silicon diammino tetrafluoride with cold ammoniacal liquor to decompose it, the decomposition also may be effected with solid silicon diammino tetrafluoride. This compound may be condensed as a white fluffy crystalline solid which is stable in the air at room temperature. The solid compound also may be decomposed with ammonia water at below 34° C. to form precipitated hydrated silica and ammonium fluoride.

As shown in reaction No. 2, ammonium silicofluoride reacts with ammonia and water to form precipitated silica and ammonium fluoride. Ammonium silicofluoride is also a volatile compound and may be formed under certain conditions of reaction when ammonium fluoride is heated with a silicious compound, especially when the ammonium fluoride is in excess. This compound may be volatilized with the silicon diammino tetrafluoride without impairing the formation of precipitated silica when the vapors react with the ammonia and water in the absorption tower.

Silicon diammino tetrafluoride may also be made by reacting on silicon fluoride with ammonia.

Titanium ammino tetrafluoride may be made from titanium compounds in the same way that silicon diammino tetrafluoride may be made and is similarly decomposed to finely divided titanium oxide by the action of ammonia and water. When titanium is present in a silicious compound which is subjected to the action of ammonium fluoride at a temperature of about 300° C., the titanium and silicon ammino tetrafluoride compounds volatilize off together. It is to be noted that titanium and silicon are adjacent members in Group IV of the Periodic table. Vanadium compounds react in the same manner, forming fluoride-ammonia compounds which are similarly decomposed to form oxides.

Although the present invention has been described in connection with specific details of operations in accordance therewith, it is not intended that these details shall be regarded as limitations upon the scope of the invention, except in so far as included in the accompanying claims.

I claim:

1. The method of forming precipitated oxides of metals of the group consisting of silicon, vanadium and titanium which comprises treating the ammino tetrafluoride compounds of metals of said group with an aqueous solution having an initial appreciable content of ammonium fluoride.

2. The method of forming precipitated oxides of metals of the group consisting of silicon, vanadium and titanium which comprises contacting vapors of the ammino tetrafluoride compounds of said metals with water, cooling the vapors and causing reaction between them and the water.

3. The method of producing precipitated silica which comprises contacting silicon diammino tetrafluoride with an aqueous solution having an initial appreciable content of ammonium-fluoride.

4. The method of producing precipitated silica, which comprises contacting silicon diammino tetrafluoride vapors with an aqueous solution containing an initial appreciable content of ammonium-fluoride in the presence of ammonia.

5. The method of producing precipitated silica which comprises contacting silicon diammino tetrafluoride vapors with an aqueous solution of at least 30% ammonium-fluoride in the presence of ammonia.

6. The method of producing precipitated silica which comprises contacting a mixture of ammonia and silicon diammino tetrafluoride vapors with an aqueous solution of ammonium-fluoride, thereby cooling said vapors and causing a reaction between them and the water.

7. The method of producing precipitated silica which comprises contacting silicon diammino tetrafluoride with water in the presence of ammonia, thereby forming precipitated silica, removing precipitated silica from the liquid, and again contacting the liquid with additional silicon diammino tetrafluoride.

8. The method of producing precipitated silica which comprises contacting silicon diammino tetrafluoride with water in the presence of ammonia, thereby forming precipitated silica in said solution, removing silica from said solution, discharging a portion of the solution from the system, replenishing the volume thereof with water and returning the solution for further treatment with silicon diammino tetrafluoride.

9. The method of producing precipitated silica, which comprises contacting silicon diammino tetrafluoride with an aqueous solution of ammonium-fluoride in the presence of ammonia, thereby forming precipitated silica in said solution, removing precipitated silica from said solution, and returning such ammonium-fluoride solution to be contacted with additional silicon diammino tetrafluoride.

10. The method of producing precipitated silica which comprises contacting a mixture of ammonia and silicon diammino tetrafluoride vapors with water, thereby forming precipitated silica, removing precipitated silica from the liquid, and again contacting the liquid with additional mixed vapors of ammonia and silicon diammino tetrafluoride.

11. The method of producing precipitated silica which comprises contacting silicon diammino tetrafluoride vapors with an aqueous solution of ammonium-fluoride in the presence of ammonia, thereby forming precipitated silica and additional ammonium-fluoride in said solution, removing precipitated silica from said solution, and returning ammonium-fluoride solution with additional water to be again contacted with silicon diammino tetrafluoride vapors.

12. The method of producing precipitated silica which comprises contacting silicon diammino tetrafluoride with an aqueous solution of ammonium-fluoride in the presence of ammonia, thereby forming precipitated silica in said solution, cooling said solution to complete the reaction, removing precipitated silica from said cooled solution, and returning such ammonium-fluoride solution to be contacted with additional silicon diammino tetrafluoride.

13. The method of producing precipitated silica which comprises contacting silicon diammino tetrafluoride vapors with an aqueous solution of ammonium-fluoride in the presence of ammonia, thereby forming precipitated silica and additional ammonium-fluoride in said solution, cooling said solution to below 34° C., removing precipitated silica from said cooled solution, and returning ammonium-fluoride solution with additional water to be again contacted with silicon diammino tetrafluoride vapor.

14. The method of producing precipitated silica which comprises contacting silicon diammino tetrafluoride with aqueous ammonium-fluoride solution in the presence of ammonia, thereby forming precipitated silica and additional ammonium-fluoride, returning said solution and contacting it further with silicon diammino tetrafluoride until a desired concentration of ammonium-fluoride is secured in the solution.

15. In the method of producing precipitated silica wherein silicon diammino tetrafluoride vapors are contacted with aqueous ammonium-fluoride solution in the presence of ammonia, thereby forming precipitated silica and additional ammonium-fluoride, the combination of steps comprising returning said solution for further contact with silicon diammino tetrafluoride vapors to secure a desired concentration of ammonium-fluoride therein, maintaining a constant recirculation of ammonium-fluoride solution of the desired concentration in contact with the silicon diammino tetrafluoride vapors, withdrawing a portion of the ammonium-fluoride solution from said circulation and supplying additional water thereto, thereby maintaining the desired concentration of ammonium-fluoride.

16. In the method of producing precipitated silica, contacting silicon diammino tetrafluoride vapors with ammonium-fluoride solution in the presence of ammonia, whereby precipitated silica is formed and the ammonium-fluoride concentration of the solution increased, removing ammonium-fluoride solution and precipitated silica, separating the precipitated silica therefrom, supplying ammonia in the ammonium-fluoride solution, thereby crystallizing a portion of the ammonium-fluoride therefrom, and returning the mother liquor containing ammonium-fluoride to be again contacted with silicon diammino tetrafluoride vapors.

17. The method of producing a mixture of precipitated silica and titanium oxide which comprises treating a mixture of titanium ammino tetrafluoride and silicon diammino tetrafluoride with water in the presence of ammonia.

18. The method of producing a mixture of precipitated silica and titanium oxide which comprises treating mixed vapors of titanium ammino tetrafluoride and silicon diammino tetrafluoride with water, cooling the vapors and causing reaction to form the mixed oxides.

19. The method of producing a mixture of precipitated silica and titanium oxide which comprises treating mixed vapors of titanium ammino tetrafluoride and silicon diammino tetrafluoride with water in the presence of ammonia, cooling the vapors and causing reaction to form the mixed oxides.

20. The method of producing precipitated oxides of the metals of the group consisting of silicon, vanadium and titanium which comprises contacting ammino tetrafluoride compounds of a metal of said group with water in the presence of ammonia, thereby forming precipitated oxide of the metal, removing the precipitated oxide from the liquid, and again contacting the liquid with additional ammino tetrafluoride compounds of the metal in the presence of ammonia.

21. The method of producing precipitated oxides of the metals of the group consisting of silicon, vanadium and titanium which comprises contacting ammino tetrafluoride compounds of a metal of said group with water in the presence of ammonia, thereby forming precipitated oxides of the metal in said solution, removing the oxides from the solution, discharging a portion of the solution from the system, replenishing the volume thereof with water, and returning the solution for further treatment with the ammino tetrafluoride compound.

22. The method of producing precipitated oxides of metals of the group consisting of silicon, titanium and vanadium which comprises contacting ammino tetrafluoride compounds of such metals with water in the presence of ammonia, thereby forming precipitated silica, and recirculating the liquid to contact with further quantities of said ammino tetrafluoride compound in the presence of ammonia.

23. The method of producing precipitated silica which comprises contacting silicon diammino tetrafluoride with water in the presence of ammonia, thereby forming precipitated silica, and recirculating the liquid to again contact with additional silicon diammino tetrafluoride in the presence of ammonia.

24. The method of producing precipitated silica which comprises contacting silicon-diammino tetrafluoride vapors with an aqueous solution of ammonium fluoride in the presence of ammonia, thereby cooling said vapors and causing reaction to form precipitated silica.

SVEND S. SVENDSEN.